United States Patent [19]

Druffel

[11] Patent Number: 4,502,954
[45] Date of Patent: Mar. 5, 1985

[54] COMBINATION FUEL FILTER AND WATER SEPARATOR

[76] Inventor: James B. Druffel, P.O. Box 535, Hylano, N.Y. 12528

[21] Appl. No.: 399,459

[22] Filed: Jul. 19, 1982

[51] Int. Cl.³ .............................................. B01D 27/08
[52] U.S. Cl. ................,..................... 210/136; 210/304; 210/311; 210/444
[58] Field of Search ............ 210/136, 304, 311, 416.4, 210/444, 446, 448, 320, 94, 512.1

[56] References Cited

U.S. PATENT DOCUMENTS

| | | |
|---|---|---|
| 1,468,906 | 9/1923 | Inman . |
| 1,780,774 | 11/1930 | White . |
| 1,822,006 | 9/1931 | Bull . |
| 2,156,329 | 5/1939 | Beck .................................... 210/112 |
| 3,272,336 | 9/1966 | Humbert, Jr. ....................... 210/132 |
| 3,428,180 | 2/1969 | Rogers ................................ 210/311 |
| 3,698,555 | 10/1972 | Conner ................................ 210/138 |
| 3,931,011 | 6/1976 | Richards et al. ............... 210/304 X |
| 4,017,397 | 4/1977 | Copeland ........................ 210/311 X |
| 4,298,465 | 11/1981 | Druffel ................................ 210/304 |
| 4,299,696 | 11/1981 | Rosaen et al. .................. 210/136 X |
| 4,322,290 | 3/1982 | Carl ................................. 210/136 X |
| 4,388,187 | 6/1983 | Eaglestone ...................... 210/311 X |

OTHER PUBLICATIONS

Article entitled "Fool Proof Fuel Filters", John G. Hussey, *Boating Illustrated*, Feb. 1979, p. 24.

Primary Examiner—Thomas Wyse
Attorney, Agent, or Firm—Owen, Wickersham & Erickson

[57] ABSTRACT

A combination fuel filter and water separator which is particularly useful at the upstream, suction side of a fuel pump includes efficient provision for initial settling of water and particulate material in a lower chamber, after which the fluid passes up through a backflow preventing check valve and into an upper chamber, where fine filtration takes place. The check valve, preferably a ball valve between the lower and upper chambers, prevents any backflow of fuel by gravity from the filter/separator assembly when a top cover is opened, e.g. for servicing of a filter element in the upper chamber. The location of the ball valve avoids subjecting it to highly contaminated entering fuel, which could foul the valve. Associated with the inlet structure of the assembly is a channel for inducing a helical flow path for centrifugally removing water and particles while imparting a downward component of motion to them.

8 Claims, 4 Drawing Figures

COMBINATION FUEL FILTER AND WATER SEPARATOR

BACKGROUND OF THE INVENTION

The invention relates to fluid separation apparatus, particularly involving separation of high density fluids and solids from a low density fluid. More specifically, the present invention embodies a filter and water separator suited to providing the level of fuel cleanliness required for proper functioning of diesel and otto type internal combustion engines.

Various forms of apparatus intended for the same purpose as the present invention are known. Typically, manufacturers of some engines have included a spin-on type of fuel filter comprising a canister within which is a barrier type resin-impregnated cellulose filter medium. Some of the spinning on type devices have been provided with an additional water coalescing medium, and a means to drain the solid and liquid contaminants, e.g. rust particles and water. Since the life of such a filter or coalescing medium cannot be predicted due to the widely varying levels of solid or liquid contaminants present in gasoline of diesel fuel, poor engine performance or failure to start may occur at any time or place due to blockage of the filter medium by the contaminants.

In some prior art systems the filtration and separation functions were divided into two separate canisters, one for each function, thereby increasing the hardware and servicing costs.

In an effort to solve some of the problems of these conventional filtering systems, combined fuel filter/water separator devices were developed. Some of these included top loading replaceable filter cartridges, transparent plastic sediment bowls and centrifugal fuel flow for aiding the separation function.

One problem with most prior art fuel filter/separator assemblies, particularly the top loading cartridge type units, was that when the top cover was opened, the fuel contained in the unit would flow back by gravity to the fuel tank. To prevent this, many devices incorporated a one-way check valve at the inlet of the unit. This location of the check valve made it easily fouled with contaminants contained in the fuel from the tank, since the valve would see the fuel before any separation or filtration step. This would cause problems in fuel flow and would prevent the check valve from filling its intented function properly, i.e. preventing backflow of fuel when the top cover was opened. Also, this location of the check valve would place a restriction at a location where the fuel often contains some water. This could tend to emulsify the water with the fuel, so that the water was then nearly impossible to separate out.

Some filter/water separator devices, in an attempt to overcome the backflow or bleedback problem, have located the inlet and outlet ports at or near the top of the unit. This required a more complex sealing system, also more susceptible to internal and external leakage. Moreover, the location of these ports near the top of the unit, while preventing backflow of fuel contained in the unit itself, would not prevent bleedback of fuel contained in the upstream fuel line back to the tank when the cover seal was broken for cartridge servicing.

The following U.S. patents show filter and/or water separator devices, some of which have similar objectives to those of the present invention: Inman U.S. Pat. No. 1,468,906, White U.S. Pat. No. 1,780,774, Bull U.S. Pat. No. 1,822,006, Beck U.S. Pat. No. 2,156,329, Humbert U.S. Pat. No. 3,272,336 and Conner U.S. Pat. No. 3,698,555. Also pertinent to the present invention is the article "Fool Proof Fuel Filters", John G. Hussey, *Boating Illustrated,* February 1979. page 24.

None of the above patents shows an anti-bleedback check valve located between a primary centrifugal separation area and a secondary filtration area, wherein the filter element is located, as in the apparatus of the present invention. Nor does any of the patents show any means for positively directing incoming fluid in a downward direction. The Inman patent shows a replaceable filtering element located inside a flow shield, and the unit of that patent has provision for settling and draw-off particulate material. There is little similarity to the present invention. Beck shows a somewhat similar arrangement, with a filter element inside a flow shield. Like Inman, the Beck device makes no provision for tangential inflow of fuel or for preventing bleedback when the unit is opened.

The Humbert patent shows a filter arranged somewhat similarly to that of Beck, appearing to be a rather typical arrangement of a cartridge or spin-on type automotive oil filter. The Bull patent shows a bypass type oil filter, adapted to pass unfiltered or partially filtered oil through pressure relief ports in the event of filter clogging, so that moving parts of an engine are not deprived completely of oil.

White shows an oil filter/separator apparatus wherein oil is admitted through a restrictive tangential orifice and a bottom-entry separator screen. Such small orifices at the entry point of water laden fuel or fuel oil cause the fuel/water mixture to emulsify, greatly increasing the difficulty of separating the two liquids, as set forth above.

Conner shows a filter system particularly for swimming pools, wherein the pool water is admitted tangentially in a centrifugal separation process. However, there is no provision in this apparatus for downwardly-directed fluid introduction, other than that provided by the normal flow path of the fluid, and as with the other patents, there is no check valve as in the present invention.

Other prior filter/separators, including some of those discussed in the above-cited article, have included anti-bleedback ball valves, but they have generally been located near the inlet so that, as discussed above, they are subjected to contamination by particles in the fluid. Also, they have been in a relatively high-velocity location, providing a narrow restriction which tends to cause emulsification of the fuel and water as discussed above. Further, some of these have employed a floating ball in the ball valve, which must be hollow for the flotation, and thus tends to be thin-skinned and subject to damage from the repeated bouncing and vibration to which such ball valves are subjected. Another difficulty has been in servicing, since many of these prior art filters required much disassembly from the bottom of the apparatus, and could not be serviced in a simple and efficient manner.

There has also been a fuel filter/separator providing for low-velocity centrifuge motion of the fuel in the first stage of separation, followed by filter element filtration, but without any anti-bleedback check valve as in the apparatus of the present invention.

None of the apparatus of the prior art provided an efficient, trouble-free and easily serviced filter/separator assembly as the present invention described below.

SUMMARY OF THE INVENTION

According to the present invention, a filter and water separator for lighter-than-water fluid comprises a frame, with a fluid inlet connected to the frame and a lower chamber communicating with and positioned below the inlet. Means are associated with the inlet in the lower chamber for inducing a swirling, arcuate flow to the fluid to separate out water and particulate material from the fluid so that they settle at the bottom of the lower chamber. Above the lower chamber is an upper chamber, with a divider interposed between the two chambers and a check valve located in the divider, oriented to pass fluid only from the lower to the upper chamber. A fluid outlet is connected to the upper chamber, which houses a filter element, positioned between the check valve and the fluid outlet in the path of fluid flow. Access means are provided for opening the upper chamber to service the filter element. By this arrangement, particulate material and water may be separated out of the fluid while it swirls at relatively low velocity in a lower chamber, before the fluid flows through the check valve, and the check valve prevents outflow or bleedback of fluid from the chamber by gravity when the access means is opened for servicing.

In a preferred form of the filter/water separator, the check valve is a ball valve with a closure ball positioned above an opening in the divider in which the ball seats. The ball is dense enough to sink in the fluid. Preferably there are included a removable gasket surrounding and on top of the opening, and a ball restraint of suitable form spaced above the opening.

The centrifuging action on the incoming fluid may be induced by a tangential arrangement of the inlet port with respect to the circular lower chamber. Also associated with the inlet may be a ramp-like, downwardly-angled conduit for imparting a downward component to the motion of the incoming fluid, to aid further in settling of fluid in the lower chamber. A flow shield collar preferably is provided, depending from the divider down into the lower chamber to isolate the helically moving incoming fluid from the check valve, before the fluid changes direction and flows up toward the check valve through the space defined by the collar.

As in some conventional filter/separator devices, there preferably is a draw-off valve at the bottom of the lower chamber for removing water and settled particulate material.

For servicing and maintenance, the lower chamber is a separate, removable component, with an easily removable connector securing it to the frame and connecting it to the upper chamber. The access to the upper chamber is provided by a readily removable top cover.

The filter element in the upper chamber may be part of a circular cartridge, closed at its upper end and open only at a central hole in its lower end, adapted to fit over an open-topped central tube in the chamber.

The filter/water separator of the invention therefore solves the problems of the prior art with a relatively trouble-free, simple and easily serviced assembly. These and other objects, advantages, features and characteristics of the invention will be apparent from the following description of a preferred embodiment, considered along with the accompanying drawings.

DESCRIPTION OF A PREFERRED EMBODIMENT

Figure 1:
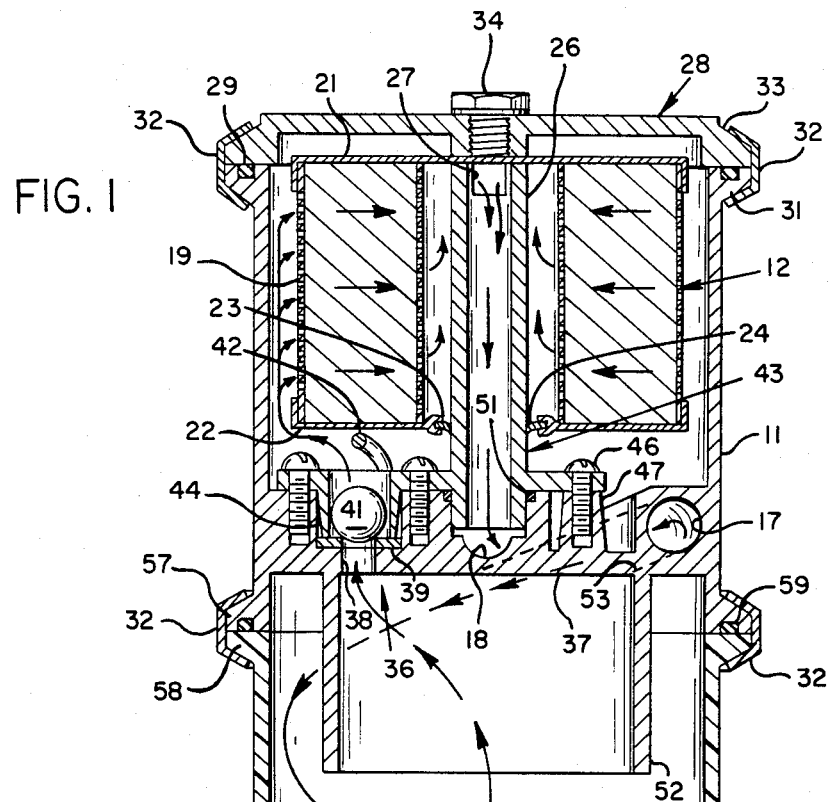
FIG. 1 is a sectional elevation view showing an assembled filter/water separator according to the invention.

In the drawings, FIG. 1 shows a filter/water separator assembly 10 having an upper chamber 11 for housing a filter cartridge 12, a lower chamber 13 for preliminary settling, with a draw-off valve 14, and a frame 16 which supports inlet and outlet ports 17 and 18 and from which the assembly 10 may be secured to structure such as in a vehicle.

Figure 2:
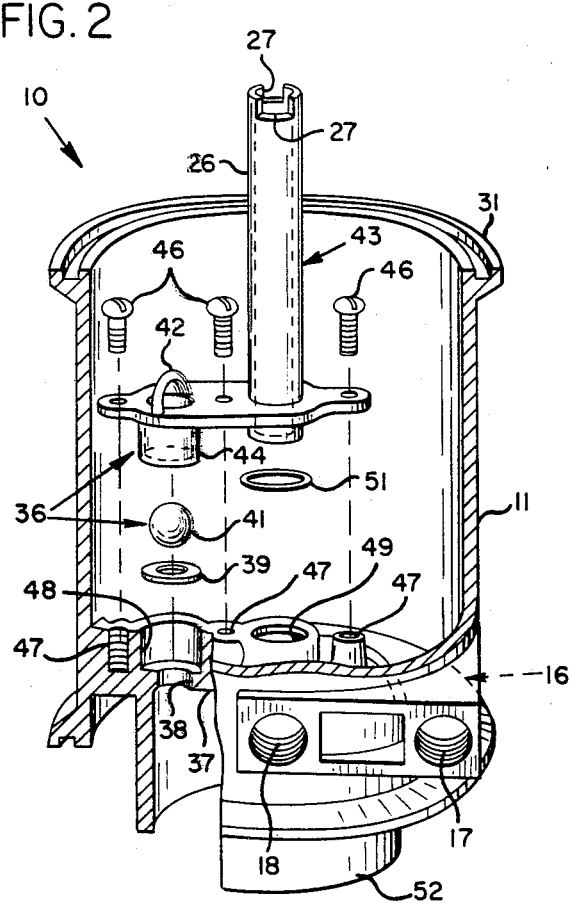
FIG. 2 is a sectional view in perspective, partially exploded, of upper portions of the assembly.
Figure 4:
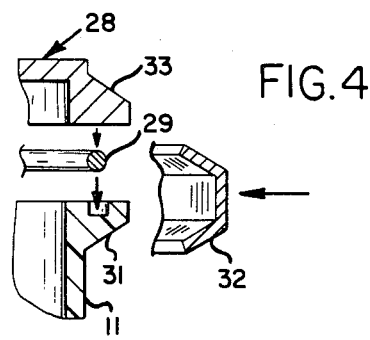
FIG. 4 is a detail sectional view showing a type of connection bracket that may be used to connect components together.
Figure 3:
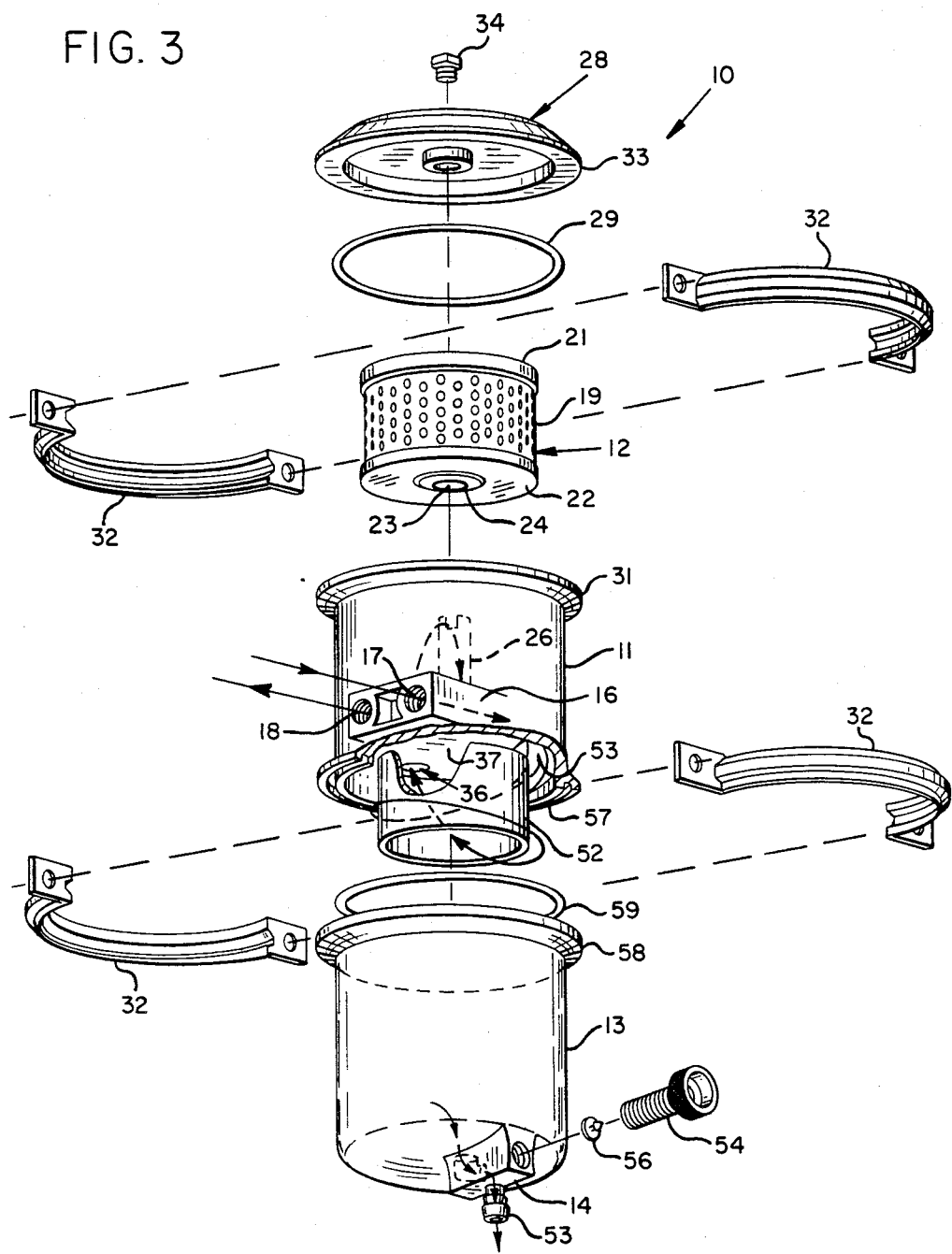
FIG. 3 is an exploded view in perspective showing the various components as they are to be assembled and indicating the path of fluid flow.

The cartridge 12 has its filter element 19 disposed around its periphery or circumference as indicated in FIGS. 1 and 2, with a closed top 21 and bottom 22 except for a hole 23 in the bottom with a gasket 24 secured around it, for sealing around a central outlet tube 26 in that chamber. As indicated in FIG. 1, the filter cartridge 12 preferably rests with its top 21 against the upper end of the central outlet tube 26, and provision is made for the entry of fuel into the outlet tube from the interior of the cartridge 12, such as by notched-out areas 27 as shown. Above the removable cartridge 12 is a top cover 28, sealed to the top of the upper chamber 11 by a gasket 29 which seats in a grooved gasket flange 31 as indicated. The cover 28 preferably is retained to the flange 31 of the upper chamber by means of a pair of semi-circular brackets 32 which are bolted together to pull the cover 28, via a tapered flange 33, down toward the similarly-shaped flange 31 of the upper chamber 11, as shown in the detail view of FIG. 4. As indicated in FIG. 3, the top cover may include a removable screw 34, for opening the upper chamber 11 to atmosphere to relieve any positive or negative pressures therein prior to removal of the top cover 28.

As outlined above, a check valve 36, preferably a ball valve as illustrated, is located between the lower chamber 13 and the upper chamber 11, in a divider 37 between these two chambers, which may be a part of or integral with the frame 16. The check valve 36 passes fluid only from the lower chamber 13 toward the upper chamber 11, its purpose being to prevent bleedback or backflow of fluid contained in the filter assembly 10 when the top cover 28 is opened, as for servicing of the cartridge 12. A preferred structural form which the check valve 36 may take is best seen with reference to FIGS. 1 and 2. A bore 38 through the divider 37 forms a valve seat for the ball valve, preferably with a resilient gasket 39 positioned over and around the opening 38, so that a valve closure ball 41 contacts the gasket 30 to close the check valve. The ball 41 is denser than the fluid, so that it will sink in the fluid to close against the seat when there is no flow of fluid from the lower chamber to the upper chamber.

Some suitable form of closure ball restraint is provided so that the ball remains in the vicinity of the opening 38. In this embodiment the restraint is provided by a smaller crossbar 42 above the ball 41, preferably formed as part of a removable component 43 which also includes the central outlet tube 26 and a collar-like structure 44 which, upon assembly of the component 43 by screws 46 into frame sockets 47 as indicated in FIG. 2, squeezes the gasket 39 against the floor of a recess 48 to hold it in place. Of course, other suitable forms of ball restraint may be used.

It is also seen from FIG. 2 that the central outlet tube 26 in the upper chamber 11 may seat into a bore 49 in the frame 16, communicating with the outlet port 18, sealed thereagainst by a gasket 51.

In the lower chamber, as the drawings indicate, there is provided a flow shield 52, in the form of a dependent collar from the divider 57 extending part way down into the lower chamber 13. Fuel enters through the inlet port 17 tangentially, as seen in FIGS. 2 and 3, thereby directed into a swirling helical path downwardly into the lower chamber 13 as indicated. The flow shield 52 separates the initial flow from the later portion of its flow path, in which it changes direction and moves up through the space defined by the flow shield or collar 52 toward the check valve 36 for admission into the upper chamber 11. This centrifuging action helps separate particulate material and water from the less dense fluid which is to be filtered. There is additionally provided in this embodiment a ramp 53 which is inclined downwardly from the inlet into the lower chamber, for positively directing the incoming fluid in a downward direction as it enters the lower chamber 13. Thus, the incoming fluid swirls helically downwardly, then changes direction rather abruptly to move back upwardly toward the check valve 36. The centrifuging action and the abrupt change of direction help cause particles and water to settle out, settling into the bottom of the lower chamber 13.

At the bottom of the lower chamber 13 is the draw-off valve 14. It may include a connection 53 for a draw-off hose (not shown), and a valve stem 54 with a gasket 56 for opening or closing the valve 14. This valve's purpose is to draw off water which has settled in the bottom of the chamber 13, and although some fine particulate material may be carried out with the water, the lower chamber must be periodically removed to clean out large accumulations of such material. This is accomplished by removing connection brackets 32 similar to those used to connect the top cover 28 on the upper chamber, as indicated in FIG. 3. These members 32 clamp two mating flanges 57 and 58 toward each other to seal the components together with a gasket 59.

The filter and water separator assembly 10 is particularly adaptable to use on the suction side of a pump, such as a fuel pump, although it may also be advantageously used on the pressure side of such a pump. On the suction side, its check valve 36 prevents backflow of fluid out of the filter assembly 10 by gravity, as previously mentioned. If the apparatus 10 is located on the pressure side of a pump, the pump may prevent such backflow or bleedback in itself, depending on the construction of the pump, so that the check valve 36 is not as critical. In either event, the check valve 36 of this invention is located downstream of the raw inlet fluid coming in the inlet port 17, so that the fluid has already had major particulate material and water settled out before it reaches the check valve, reducing the tendency to foul the check valve.

In operation of the filter and water separator assembly 10, the entering fluid passes through the inlet port 17 tangentially with respect to the lower chamber, and is directed in a downward, helical path around the flow shield 52 and down into the chamber 13 at relatively low velocity and without any narrow restrictions. The centrifuging action releases much of the particulate material and water borne by the fluid, and it settles to the bottom of the chamber 13. Below the bottom of the flow shield 52, the fluid changes direction rather abruptly, further releasing water and particles, and moves up through the check valve 36 and into the upper chamber 11. There, the fluid spreads out under the bottom of the filter cartridge 12, to the space between the cartridge's element 19 and the wall of the chamber 11, thence through the element 19 and into the interior of the filter cartridge 12. The element 19 removes fine material from the fluid, so that the fluid has been highly filtered when it reaches the interior of the cartridge. The fluid inside the cartridge exits via the notches 27 near the top of the outlet tube 26, passes through the tube 26 and then through the outlet 18 of the assembly 10. The positioning of the notches 27 at the top of the outlet tube assures that the filter cartridge 12 will remain substantially full of fluid, so that the entire area of the filtering element 19 will be used.

The preferred embodiment described herein is intended to be purely illustrative, and not limiting of the scope of the invention. Other embodiments and variations will be apparent to those skilled in the art and may be made without departing from the essence and scope of the invention as defined in the following claims.

I claim:

1. A filter and water separator for lighter-than-water fluid, comprising:

a frame;

a fluid inlet connected to the frame;

a circular lower chamber communicating directly with and positioned below the inlet, the inlet being disposed tangentially to the lower chamber such as to induce a swirling, arcuate flow to the fluid to separate out water and particulate material from the fluid centrifugally so that they settle at the bottom of the lower chamber, and further including a ramp-like conduit extending generally helically into the lower chamber from the inlet, on a downward angle, for imparting a helical flow path and downward component to the motion of the incoming fluid, to aid in settling of material in the lower chamber;

an upper chamber above the lower chamber;

a divider between the lower and upper chambers with a check valve therein, downstream of the lower chamber and upstream of the upper chamber and oriented to pass fluid only from the lower to the upper chamber, after such fluid has had said water and particulate material settled out in the lower chamber;

a generally circular open-bottomed flow shield collar extending downwardly from the frame part way into the lower chamber, just inside the helical flow path of the incoming fluid and surrounding the check valve, so that the helically moving incoming fluid is isolated from the check valve initially, then flows up into the space defined by the collar and through the check valve;

a fluid outlet connected at a downstream end of the upper chamber;

a filter element in the upper chamber, positioned between the check valve and the fluid outlet in the path of fluid flow; and access means for opening the upper chamber to service the filter element;

whereby particulate material and water may be separated out of the fluid while it swirls at relatively low velocity in the lower chamber, before the fluid flows through the check valve, which would otherwise be subject to fouling by the particulate material, and the check valve prevents outflow of fluid from the chamber by gravity when the access means is opened.

2. The filter and water separator of claim 1, wherein the check valve comprises a ball valve, including a closure ball positioned above the divider and of density sufficient to sink in the fluid, and an opening in the divider between the lower and upper chambers in which the ball is adapted to seat.

3. The filter and water separator of claim 2, with the check valve further including a closure ball restraint spaced above the opening in the divider, and a removable seat gasket above and surrounding the opening.

4. The filter and water separator of claim 1, the ramp-like conduit being integral with the divider.

5. The filter and water separator of claim 1, further including a draw-off valve at the bottom of the lower chamber, for removing settled water and particulate material.

6. The filter and water separator of claim 1 or 5, the lower chamber being a separate, removable component, with means for sealingly connecting it to the upper chamber.

7. The filter and water separator of claim 1, the access means comprising a removable top cover on the upper chamber, and means for sealingly connecting it to the upper chamber.

8. The filter and water separator of claim 1, wherein the filter element is part of a generally circular filter cartridge having upper and lower closed ends with a central opening in the lower end, and including a central tube extending up from the divider in the upper chamber, connected to the outlet at its lower end and having an open upper end positioned to be within the filter cartridge to receive filtered fluid moving toward the outlet through the tube.

* * * * *